United States

[11] 3,563,146

[72] Inventor Joseph F. G. Miller
Lincoln, Mass.
[21] Appl. No. 721,223
[22] Filed Apr. 15, 1968
[45] Patented Feb. 16, 1971
[73] Assignee Itek Corporation
Lexington, Mass.
a corporation of Delaware

[54] SINGLE LENS PANORAMIC CAMERA
14 Claims, 3 Drawing Figs.
[52] U.S. Cl. .................................................. 95/16,
95/12.5
[51] Int. Cl. .......................................................... G03b 37/02
[50] Field of Search ............................................. 95/12.5, 15,
16, 17

[56] References Cited
UNITED STATES PATENTS
2,955,518  10/1960  Perry ............................. 95/12.5
3,023,662  3/1962  Hicks ............................. 95/16X Primary Examiner—John M. Horan
Attorneys—Homer O. Blair, Robert L. Nathans, Lester S. Grodberg and Joseph S. Iandiorio ABSTRACT: Apparatus for enabling a panoramic camera to make a plurality of scans of an area of interest during each revolution of the scanning mechanism, including deflection means for scanning the area of interest and means for moving the deflection means relative to an axis transverse to the axis of rotation of the scanning mechanism after a scan has been completed during a first portion of a revolution, to reorient the deflection means to perform another scan of the area of interest during another portion of that revolution.

JOSEPH F. G. MILLER
INVENTOR.

BY
Joseph S. Sandiono
ATTORNEY.

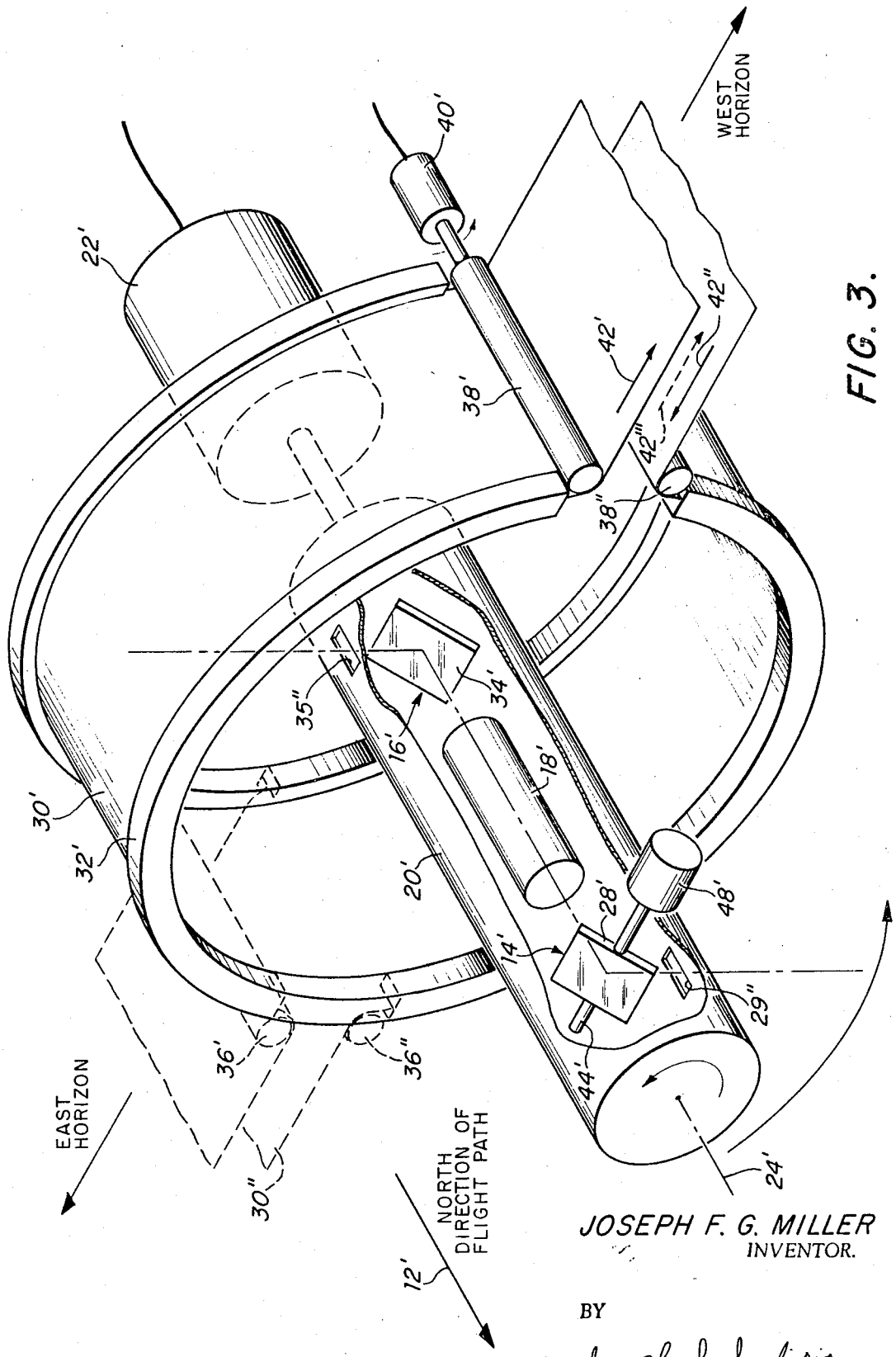

3,563,146

SINGLE LENS PANORAMIC CAMERA

CHARACTERIZATION OF INVENTION

The invention is characterized in apparatus in a panoramic camera having a scanning mechanism for providing a plurality of scans of an area of interest during each revolution of the scanning mechanism comprising first deflection means for scanning the area of interest and first means for moving the deflection means relative to an axis transverse to the axis of rotation of the scanning mechanism after a scan has been completed during a first portion of a revolution to reorient the first deflection means to perform another scan of the area of interest during another portion of that revolution.

BACKGROUND OF INVENTION

This invention relates to panoramic cameras and, more particularly, to such cameras capable of continuous scanning using a single lens system.

Generally, in panoramic cameras full cycle scanning is accomplished by means of two lens systems which are offset from one another, for example by 108°. Thus after one system completes its scan of the ground during a first part of a revolution of the scanning mechanism and is being recycled, the other lens system is scanning the area of interest.

Although such double lens systems provide the capability for full cycle scanning, they increase the cost, the weight, the size, and the complexity of the equipment as compared to a single lens panoramic camera.

SUMMARY OF INVENTION

Thus it is desirable to have available a panoramic camera having a single lens system scanning mechanism capable of full cycle scanning of the area of interest.

The invention may be accomplished by a panoramic camera having a rotatable support member, drive means for rotating the support member in one direction, and first and second radiation reflective elements mounted for rotation with the support member. The first radiation reflective element scans the area to be photographed from a first angular limit to a second angular limit in the direction of rotation and directs the radiation from that area along the support member to the second radiation reflective member which directs the radiation onto a photographic film. The first reflective element is movable relative to an axis transverse to the rotational axis of the support member. Means are provided for moving the first reflection means relative to that transverse axis after it has completed scanning from the first to the second limit, to position the first reflection means to again receive radiation from the direction of the first limit and direct it along the support member to the second reflection means.

DISCLOSURE OF PREFERRED EMBODIMENTS

Other objects, features and advantages will appear from the following description of preferred embodiments, taken with the accompanying drawings, in which.

Figure 1:
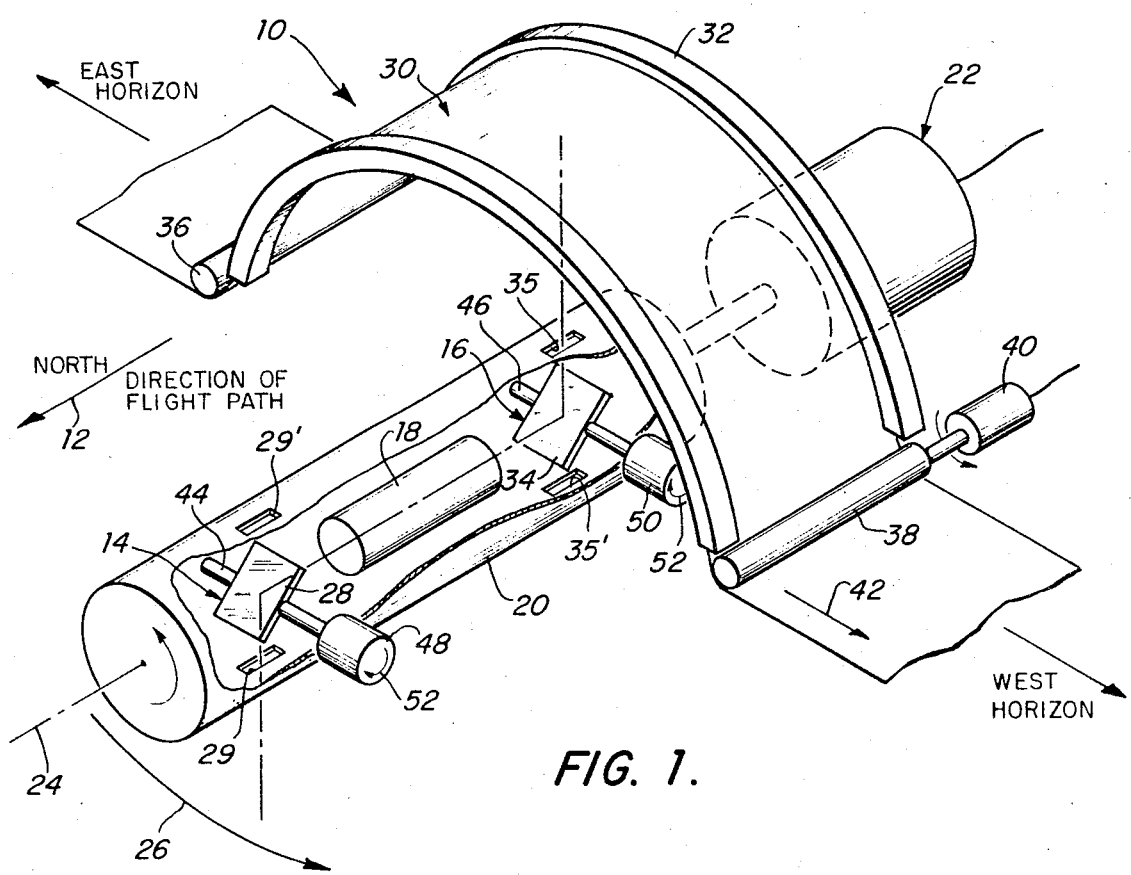
FIG. 1 is a diagrammatic perspective view of a portion of a panoramic camera utilizing two mirrors mounted at either end of a rotatable member, photographic film held in a cylindrical path by a platen, and means for rotating each of the mirrors about an axis transverse to the rotational axis of the rotatable member according to this invention.

FIG. 3 is a diagrammatic perspective view of a portion of a panoramic camera similar to FIG. 1 in which the second, or imaging, mirror is not rotatable about an axis transverse to the rotational axis of the rotatable member and the platen holds the film in a cylindrical path which is substantially a closed path about the rotatable member. A portion 10 of a single lens embodiment of the invention capable of full cycle scanning is shown in FIG. 1, where the vehicle carrying the camera is shown by arrow 12 to be on a northerly course. The camera in FIG. 1 is the optical bar type and includes scanning reflector element 14, imaging reflector element 16 and lens 18, which may be a lens system of the Gaus or Triplett type, housed in support member 20 and rotated by motor 22 about longitudinal axis 24 in the counterclockwise direction, arrow 26. Thus, scanning of the ground takes place from east to west by reflecting surface or mirror 28 of reflecting element 14 and the image is projected onto film 30, disposed in platen 32 in a cylindrical path concentric with longitudinal axis 24, from west to east by reflecting surface or mirror 34 of reflecting element 16. As member 20 rotates mirror 28 scans the ground through axial slit 29 and reflects the light therefrom to mirror 34 in a path coincident with longitudinal axis 24 and through lens 18. The light is then reflected again by mirror 34 through axial slit 35 and imaged on film 32 above so that narrow sections of the film transverse to the scan direction are successively exposed. The optical axis of mirrors 28 and 34 and lens 18 need not be coincident with the axis 24 of rotation of member 20, nor even parallel to it: it may be skew to axis 24. Film 30 passes over roller 36 through platen 32 and over roller 38 rotated at constant uniform speed by motor 40 to drive film 30 in the direction of arrow 42.

At the beginning of a scan mirror 28 faces toward the east limit or horizon and mirror 34 faces toward the west limit or horizon, i.e. the area proximate roller 38. As member 20 rotates, mirror 28 scans across the ground from east to west horizon or limit while mirror 34 sweeps across film 30 from the area of the film near roller 38 to the area of the film near roller 36, i.e. from west to east. In FIG. 1 member 20 is shown at the midway point of its rotation from east to west wherein mirror 28 is facing approximately straight down at the ground and mirror 34 is facing straight up at the center of film 30.

When mirror 28 is facing the west horizon it is no longer scanning areas of interest on the ground but is scanning the sky or a portion of the camera housing, and mirror 34 is no longer directed at photographic film 30 but onto a portion of the camera housing. In conventional panoramic cameras this problem may be solved by using a second lens system which is offset 180° from the first system, so that as one lens system loses sight of the ground and sees the sky or camera housing the other lens system is leaving the camera housing and beginning to see the ground.

The present invention solves the problem without addition of a second lens system by means of elements 14 and 16 mounted on shafts 44 and 46 which are transverse to the axis of rotation of member 20 and rotatable by motors 48 and 50, respectively. When mirror 28 is facing toward the west and mirror 34 is facing toward the east at roller 36 or off the film completely, motors 48 and 50 are energized to rotate shafts 44 and 46 90° in the counterclockwise direction, arrows 52. A 90° counterclockwise rotation of each element repositions it transverse to its previous position so that when scanning begins the second time at the east horizon mirrors 28 and 34 assume the orientation previously held when scanning began at the east horizon the first time. Thus, although member 20 has rotated only half a revolution, the mirrors are again recording as when member 20 was at the beginning of the revolution or as if member 20 had already rotated a full revolution. Mirrors 28 and 34 are now operative through slits 29' and 35', respectively. The 90° rotation of elements 14 and 16 about shafts 44 and 46, respectively, is repeated after each scan.

It should be understood that a scan in which the limits are opposite horizons might not be and generally is not a 180° scan but some angle less than 180°, for example 140°. Then, establishing 0° and 180° as being the directions straight out from the sides of the camera and airplane, the scan would begin at 20° and end at 160° while the sweep of the film would begin at 200° and end at 340°. Thus, when one mirror reaches the end of scan, 160° limit, and the other reaches the end of film sweep, 340° limit, they need not be rotated immediately; they may be rotated any time during the period that the optical bar is rotating the interim 40°, until the time when those mirrors reach the 200° and 20° limits, respectively. Rotation precisely at 160° and 340° directs the mirrors back toward the 20° and 200° limits, i.e. in that general direction, but not right at them until the optical bar rotates that interim 40°. In this manner a single lens system comprising lens 18 and mirrors 28 and 34 may provide fulltime scanning.

Figure 2:
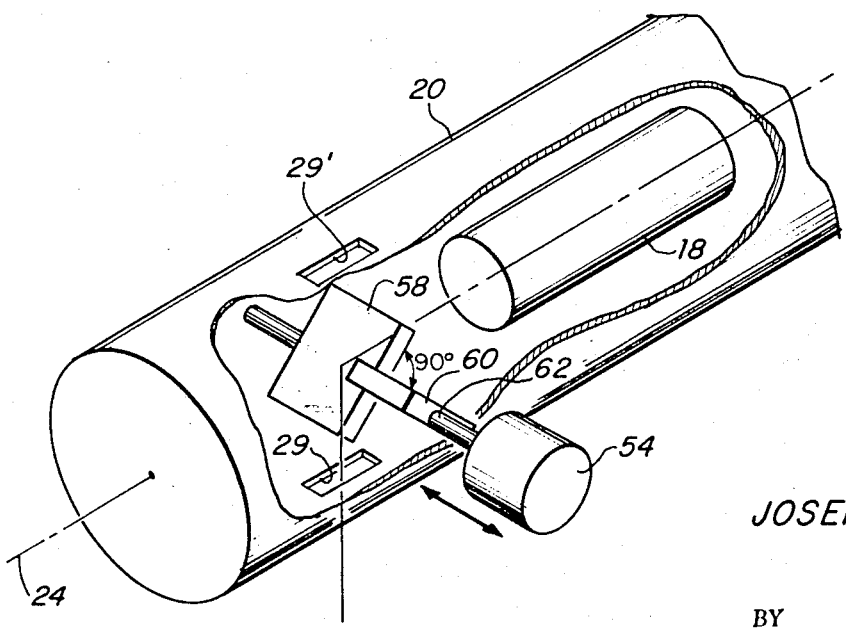
FIG. 2 is a view of a portion of FIG. 1 with parts removed and in perspective showing alternate means to move the mirrors relative to a transverse axis.

Instead of having reflecting element 14 mounted on shaft 44 for rotation by motor 48, a linear actuator 54, FIG. 2, such as a solenoid, may be substituted for motor 48, so that mirrors 28 and 34 may be shifted into and out of the optical axis of lens 18 along an axis transverse to the longitudinal axis 24. For example, two reflecting elements 58, 60 may be positioned adjacent each other on shaft 62 offset 90° from each other. Then when the reflecting element performing the scanning operation can no longer scan the ground, the solenoid would be energized to move its shaft and shift the other reflecting element into scanning position. And reflecting element 16 may also be controlled in this manner.

Certain structures have been included here for ease of understanding but are not essential to the inventive concept. For example, the camera need not operate with visible light but may as well perform with ultraviolet, infrared, X-ray, and other forms of radiation; the translating system for focusing the radiation need not be an optical lens system 18. The term photography or photographic is used here in its fullest sense, viz. the art or process of producing images on a sensitized surface by the action of light or other radiant energy. The invention is not limited to use with mirrors or other reflective elements for refractive elements may also be used to deflect the radiation. In addition, the invention is applicable in cameras performing oblique scans.

Another embodiment of this invention capable of scanning with a single lens system scanning mechanism is shown in FIG. 3; like parts have been given like numbers accompanied by a prime mark. The primary structural distinction between the embodiments of FIGS. 1 and 3 is that in the embodiment of FIG. 3 reflecting element 16' is not movable relative to an axis transverse to the axis of rotation of member 20'. Film 30' is disposed in a cylindrical path about member 20' in substantially a closed path in order to provide a recording medium for mirror 34' as it rotates with member 20'.

Film 30' is fed around roller 36' and over cylindrical platen 32' in the direction shown by arrow 42' by drive roller 38' driven by motor 40'. Alternatively, two film supplies may be used to feed two film segments 30', 30'' through two semicircular platens, in which case film 30' would be drawn around roller 36' and through the platen by drive roller 38', and film 30'' would be drawn in the direction of arrow 42'' around roller 38'' and through the platen by roller 36'' driven by another motor similar to motor 40' or by motor 40' by means of a suitable transmission. Or film 30'' may be drawn in the direction of arrow 42''', around roller 36'' and through the platen by roller 38'' driven by a motor not shown. As member 20' rotates continuously at uniform speed element 16' is not repositioned relative to member 20' twice in each revolution. Rather, mirror 34' of element 16' remains stationary through a full rotation 360°. Mirror 28' is operative through slits 29'' and 29''' (not visible because of cutaway view) and mirror 34' is operative through slit 35''.

In the embodiment of FIG. 3, if the film is fed as two separate films 30' and 30'', and film 30' is driven in the direction of arrow 42' while film 30'' is driven in the direction of arrow 42'', the films may be driven with continuous uniform motion. But a different result is obtained if the film in the lower portion of the platen is moving in the direction of arrow 42''' whether the film in the upper and lower portions is one continuous length or two separate lengths. For then film in the lower portion is moving in the same direction as the image is, as the image is swept across the film by the rotating mirror 34'. This relationship may be expressed:

$$V_I = V_F - V_S \text{ or}$$

$$V_F = V_I + V_S$$

where $V_S$ is the scan speed of the image at the film, $V_F$ is the speed of the film and $V_I$ is the speed of the image relative to the film. In the upper half of platen 32' the film is moving in the opposite direction to the image as it is being swept across the film by mirror 34' and this relationship is expressed:

$$V_I = V_F + V_S \text{ or}$$

$$V_F = V_I - V_S.$$

Thus when the image is being swept across film in the upper half of platen 32' the speed of the film $V_F$ is equal to the difference between the image speed $V_I$ and scan speed of the image at the film $V_S$ required for operation of the optical bar camera. However when the image is being swept across the film in the lower half of platen 32' the speed of the film $V_F$ is equal to the sum of the image speed $V_I$ and scan speed of the image at the film $V_S$ required for operation of the optical bar camera. As a result during portions of the scan utilizing the lower half of the film, the film must be moved $2V_S$, twice the scan speed of the image at the film, faster than when the film in the upper half is utilized, in order to maintain the proper relative motion between the image and film in the optical bar camera.

As is apparent from the foregoing explanation of two specific embodiments, the invention may take many forms. Other embodiments will occur to those skilled in the art and are within the following claims.

I claim:

1. A panoramic camera having a single lens system scanning mechanism, which rotates about an axis of rotation, for providing a plurality of scans of an area of interest during each revolution of said scanning mechanism, comprising:
   a. said scanning mechanism having first deflection means for scanning the area of interest, and first means for moving said deflection means relative to an axis transverse to the axis of rotation of said scanning mechanism after a scan has been completed during a first portion of revolution to reorient said deflection means to perform another scan of the area of interest during another portion of that revolution; and
   b. said scanning mechanism further having second deflection means spaced from said first deflection means for rotation with said first deflection means, and second means for moving said second deflection means relative to an axis transverse to said axis of rotation after said first deflection means has completed scanning from a first and second angular limit and said second deflection means has exposed a section of film between a third and a fourth angular limit, to position said second deflection means to receive radiation from said first deflection means and again direct it toward said third angular limit.

2. The panoramic camera of claim 1 in which said second means for moving includes shaft means parallel to said transverse axis relative to which said second deflection means is movable, and to which said second deflection means is fixed, and second drive means for moving said shaft means.

3. The panoramic camera of claim 2 in which said second drive means imparts rotational motion to said shaft means.

4. The panoramic camera of claim 2 in which said second drive means imparts linear motion to said shaft means.

5. A panoramic camera having a single lens scanning mechanism for providing a plurality of scans of an area of interest during each revolution of said scanning mechanism comprising:
   first radiation reflection means for scanning an area to be photographed from a first angular limit to a second angular limit;

film positioning means for receiving photographic film and supporting it in a cylindrical path around the axis of rotation of said scanning mechanism;

second radiation reflection means, spaced from said first reflection means and rotatable with it, for receiving radiation from said first reflection means and directing it onto said film from a third to a fourth angular limit;

means for moving said first reflection means relative to an axis transverse to said axis of rotation, after it has completed scanning from said first to said second limit, to position said first reflection means to again receive radiation form the direction of said first limit and reflect it to said second reflection means; and second means for moving said second reflection means relative to an axis transverse to said axis of rotation, after it has completed directing radiation onto said film between said third and fourth limits, to again direct radiation from said first reflection means toward said third limit.

6. A panoramic camera having a single lens system scanning mechanism, which rotates about an axis of rotation, for providing a plurality of scans of an area of interest during each revolution of said scanning mechanism, comprising:

a. film positioning for receiving photographic film and positioning it in a plurality of arcuate portions of a cylindrical path around said axis of rotation; and b. said scanning means having first deflection means for scanning the area of interest, and first means for moving said deflection means relative to an axis transverse to the axis of rotation of said scanning mechanism after a scan has been completed during a first portion of a revolution to reorient said first deflection means to perform another scan of the area of interest during another portion of that revolution.

7. A panoramic camera having a single lens system scanning mechanism which rotates about an axis of rotation, for providing a plurality of scans of an area of interest during each revolution of said scanning mechanism, comprising:

a. film positioning means for receiving two photographic films and positioning each of them in separate arcuate portions of a cylindrical path around said axis of rotation; and b. said scanning mechanism having first deflection means for scanning the area of interest, and first means for moving said deflection means relative to an axis transverse to the axis of rotation of said scanning mechanism after a scan has been completed during a first portion of a revolution to reorient said first deflection means to preform another scan of the area of interest during another portion of that revolution.

8. A panoramic camera having a single lens system scanning mechanism, which rotates about an axis of rotation, for providing a plurality of scans of an area of interest during each revolution of said scanning mechanism, comprising:

said scanning mechanism having first deflection means for scanning the area of interest, and first means for moving said deflection means relative to an axis transverse to the axis of rotation of said scanning mechanism after a scan has been completed during a first portion of a revolution to reorient said first deflection means to perform another scan of the area of interest during another portion of that revolution; and b. said scanning mechanism further having second deflection means, including a reflection element, spaced from said first deflection means for rotation with said first deflection means.

9. In an optical bar panoramic camera wherein an optical bar scanning mechanism with a single lens system rotates about a scanning axis to scan a film medium, positioned in a cylindrical plane about the scanning axis, with the image of a photographed scene, the improvement comprising deflection means, including a positionable image deflector, in said scanning mechanism for deflecting said image to the film medium by a first optical path, having a first entrance aperture, during a first scanning period when said first entrance aperture faces said scene and said image deflector is in a first position, and for deflecting said image to the film medium by a second optical path, having a second entrance aperture, during a second scanning period when said second entrance aperture faces said scene and said image deflector is in a second position, said first and second entrance apertures being angularly displaced in said scanning mechanism about said scanning axis to successively face said scene as said scanning mechanism rotates.

10. Apparatus as set forth in claim 9 wherein said deflection means includes a first reflective surface means, and means for moving said first reflective surface means relative to an axis transverse to said scanning axis after said first scanning period has been completed, to reorient said first reflective surface means during said second scanning period.

11. Apparatus as set forth in claim 10 wherein said means for moving said first reflective surface means includes means for causing said first reflective surface means to rotate approximately 90° around said axis transverse to said scanning axis.

12. Apparatus as set forth in claim 10 wherein said first reflective surface means includes first and second reflective surfaces positioned orthogonally to each other along said axis transverse to said scanning axis, and said means for moving said first reflective surface means includes means for moving said first reflective surface means along said axis transverse to said scanning axis, whereby either said first or second orthogonal reflective surface may be selectively positioned respectively in either said first or second optical paths.

13. Apparatus as set forth in claim 10 wherein:

a. said deflection means includes a second reflective surface means spaced from said first reflective surface means along said scanning axis, said second reflective surface means being rigidly positioned in said scanning mechanism; and b. said film medium is positioned in a cylindrical plane substantially 360° about said scanning axis.

14. Apparatus as set forth in claim 10 wherein:

said deflection means includes a second reflective surface means spaced from said first reflective surface means along said scanning axis;

b. means are provided for moving said second reflective surface means relative to an axis transverse to the scanning axis after said first scanning period to reorient said second reflective surface means during said second scanning period; and c. the film medium is positioned in a cylindrical plane substantially 180° about said scanning axis.